INVENTOR.
WILLIAM E. YOUNG
BY
Kenyon & Kenyon
ATTORNEYS

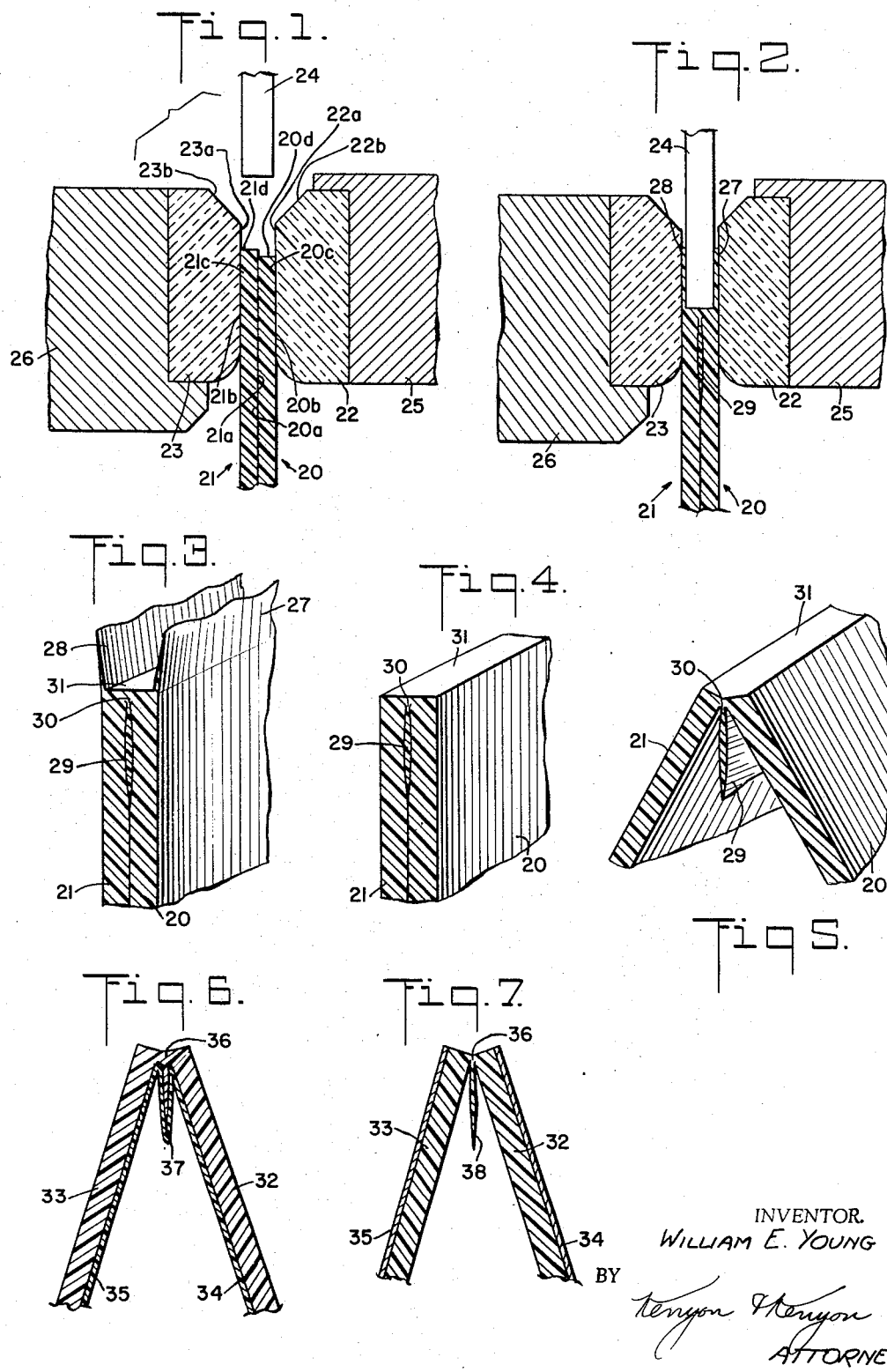

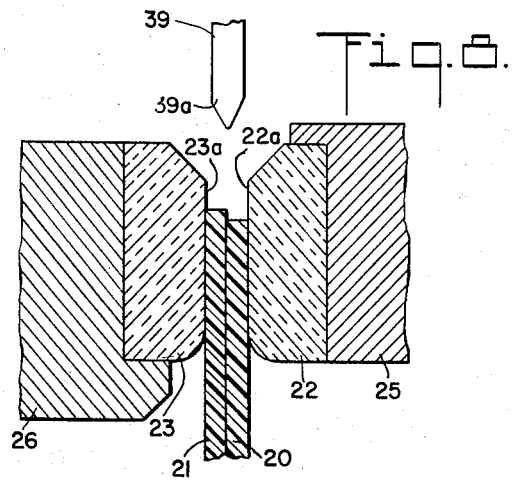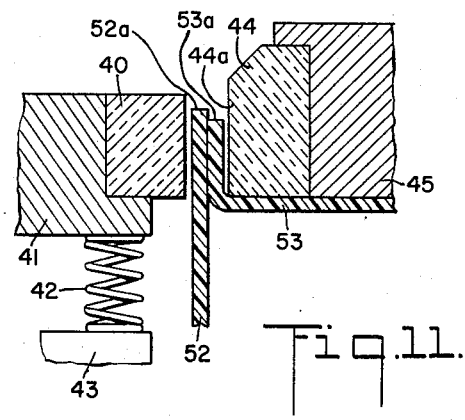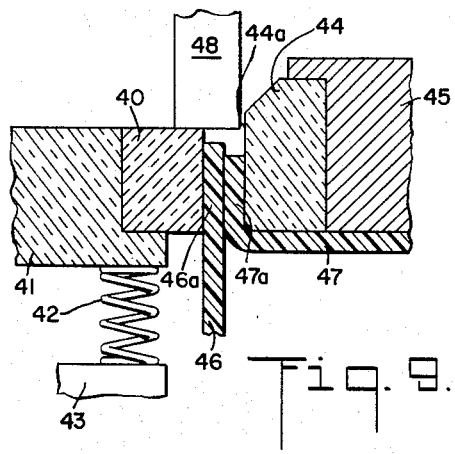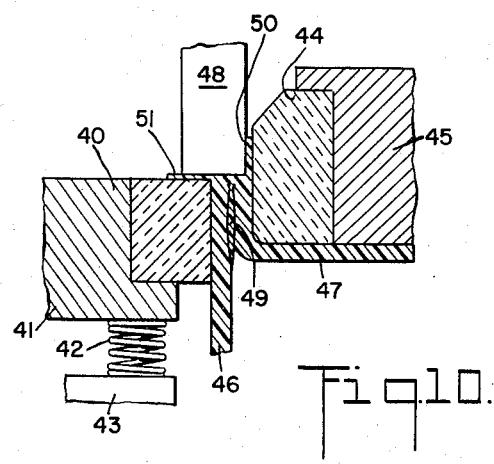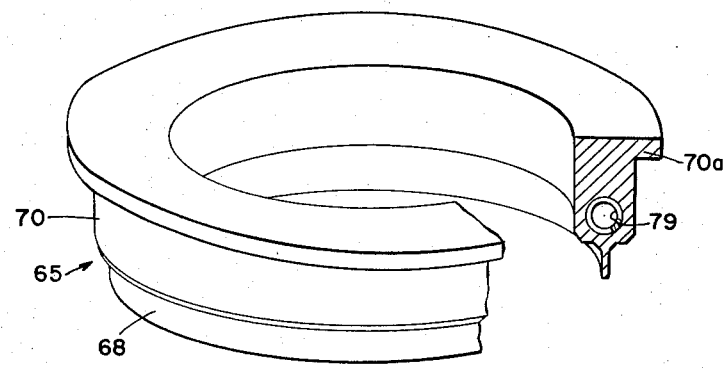

United States Patent Office 3,342,817
Patented Sept. 19, 1967

3,342,817
METHOD AND APPARATUS FOR
HEAT SEALING
William E. Young, 52 Sea Beach Drive,
Stamford, Conn. 06902
Filed Feb. 3, 1964, Ser. No. 342,020
14 Claims. (Cl. 264—248)

This invention relates to the sealing of members of thermoplastic material to one another and more particularly to the sealing of such members to one another in the portion adjacent an edge of each.

In accordance with the prior art, members of thermoplastic material have been heat sealed to one another by the application of heat and pressure to the exposed sides of the members. With such a method it is possible for foreign matter, disposed upon the facing surfaces to be sealed to one another, to interfere with the obtaining of a uniformly tight seal. But more importantly, since sealing by this method requires that sufficient heat be transmitted through the members to the exposed sides of the members in order to bring the innerface to a sealing temperature, this method requires a sealing cycle of long duration, especially when the members are thick in section.

In another method of the prior art, members of thermoplastic material have been sealed by fusing the adjacent edge portions of both members into a molten mass which upon cooling forms a bead of thermoplastic material. Again, the presence of foreign matter between the members to be sealed can interfere with the formation of a tight seal. In addition, the formation of the bead requires that a relatively large amount of the edge portions of the members be fused together and subsequently cooled. These steps can make it difficult to obtain the speed of operation and the simplicity of equipment which are desired.

Attempts to produce vacuum-sealed containers of thermoplastic material have been complicated and in many cases made unsuccessful by the difficulty of forming a hermetically-tight seal between the body member and the cover member of the container when the two members are relatively thick in section. Consequently, hermetically-sealed containers are presently limited in the most part to those made of flexible fibers, metal cans, or glass jars and bottles. The contamination of the surfaces to be sealed by the contents of the container often prevents the obtaining of an uninterrupted and completely tight seal. Furthermore, since the art of packing containers normally involves high production rates, methods which require relatively long periods of time for fusing large masses of container material or which require the application of heat and pressure to comparatively inaccessible areas of the container are generally unsuccessful.

It is one of the objects of the invention to seal two members of thermoplastic material to one another in the portions adjacent the edges of the members.

It is another object of the invention to seal two members of thermoplastic material by the application of heat and pressure to the edges of the members positioned adjacent to one another.

It is still another object of the invention to seal two members of thermoplastic material to one another in the portions adjacent the edges thereof in a manner which insures that any foreign matter between the members is displaced from the region of the seal.

It is an additional object of the invention to seal the edge portions of two members of thermoplastic material disposed contiguous to one another while substantially maintaining the original form of the edge portions through the sealing operation.

It is a further object of the invention to provide apparatus for sealing two members of thermoplastic material by extruding a portion of material melted at the edges of the members between the contiguous surfaces of the members, thereby enabling the members to join adjacent the edges thereof in order to form a seal.

In one version of the method of the invention, the method comprises the steps of placing the members of thermoplastic material with the edges thereof and the portions adjacent the edges adjacent to one another in a facing relationship and substantially contiguous with one another. The method further includes the step of enclosing the oppositely disposed surfaces of the portions of the members adjacent the edges thereof. The method also contains the steps of melting at least some of the portions of the members adjacent their edges urging at least some of the melted material between the portions adjacent the edges of the members. Following these steps, the method includes the step of solidifying the melted material adjacent the edges, whereby the members are sealed to one another adjacent the final edges thereof.

In another version of the method of the invention the edges of the members and the portions adjacent thereto are positioned between a pair of supports. At least some of the portions adjacent the edges are melted and the melted material is confined to urge at least some of it between the members. Upon cooling, the melted material solidifies and seals the members together adjacent the final edges thereof.

In still another version of the invention, a heated device extending along the length of the edges of the members is advanced between the supports adjacent to the members into engagement with the edges to melt at least some of the material of the portion adjacent thereto and to urge it between the members. Upon cooling, the members are sealed to one another adjacent the final edges thereof.

In an additional version of the method of the invention, the two members of thermoplastic material, having a coating of material thereon, are positioned between the supports with the coatings in a facing relationship. Upon the application of heat and pressure to the edges of the members, the coating is extruded between the members and a seal is formed in the material of the members adjacent to the final edges thereof.

In a further version of the method of the invention, the edges of the body portion and the top portion of a container are sealed to one another by the application of heat and pressure to the edges as they are confined.

In an embodiment of the apparatus of the invention, the edges and the portions of the members adjacent the edges are disposed between substantially parallel supports. The heated seal bar which is adapted to mate within the spacing between the supports is advanced therebetween to melt the edge portion of the members and form the seal.

In another embodiment of the apparatus of the invention, the heating seal bar is provided with a wedge-shaped edge portion which engages the edges of the members to be sealed.

In an additional embodiment of the apparatus of the invention at least one of the supports is adapted to be displaced by the heating element as it is advanced toward the edge portions of the members to be sealed.

In a further embodiment of the apparatus of the invention the supports and heating element are disposed within a chamber which is adapted to be evacuated in order to enable a container to be sealed while in an evacuated condition.

Other objects and advantages of the invention will become apparent from the following description taken in conjunction with the accompanying drawings in which:

FIG. 1 is an enlarged fragmentary vertical section view of the edges of two members of thermoplastic positioned between the supports and of the seal bar prior to engagement with the edges of the members;

FIG. 2 is an enlarged fragmentary vertical section view of the seal bar in engagement with the edges of the members and showing the melted plastic material being extruded between the members and adjacent to the seal bar;

FIG. 3 is an enlarged fragmentary perspective view of the sealed members showing flashes of material extending therefrom and therebetween;

FIG. 4 is an enlarged fragmentary perspective view of the sealed edge portions following the removal of the flashes extending outwardly from the edges of the members;

FIG. 5 is an enlarged fragmentary perspective view of the sealed members displaced from one another and showing the extruded flash extending therebetween;

FIG. 6 is an enlarged fragmentary vertical section view showing the seal of the invention form in members of thermoplastic material having a coating of thermoplastic material thereon;

FIG. 7 is an enlarged fragmentary vertical section view showing the seal of the invention in members each having a coating on the outer surface thereof and disposed opposite to one another;

FIG. 8 is an enlarged fragmentary vertical section view showing a seal bar having a tapered edge and the edges of the members prior to being engaged by the seal bar;

FIG. 9 is an enlarged fragmentary vertical section view showing a resiliently mounted support in engagement with the seal bar being advanced toward the edges of a container of thermoplastic material;

FIG. 10 shows the apparatus of FIG. 9 with the seal bar in contact with the edges of a container;

FIG. 11 is an enlarged fragmentary vertical section view showing the edge portions of a container disposed with a clearance between them and the supports;

FIG. 14 is a perspective view, partially in section, showing a seal bar for use in sealing circular containers.

Figure 12:
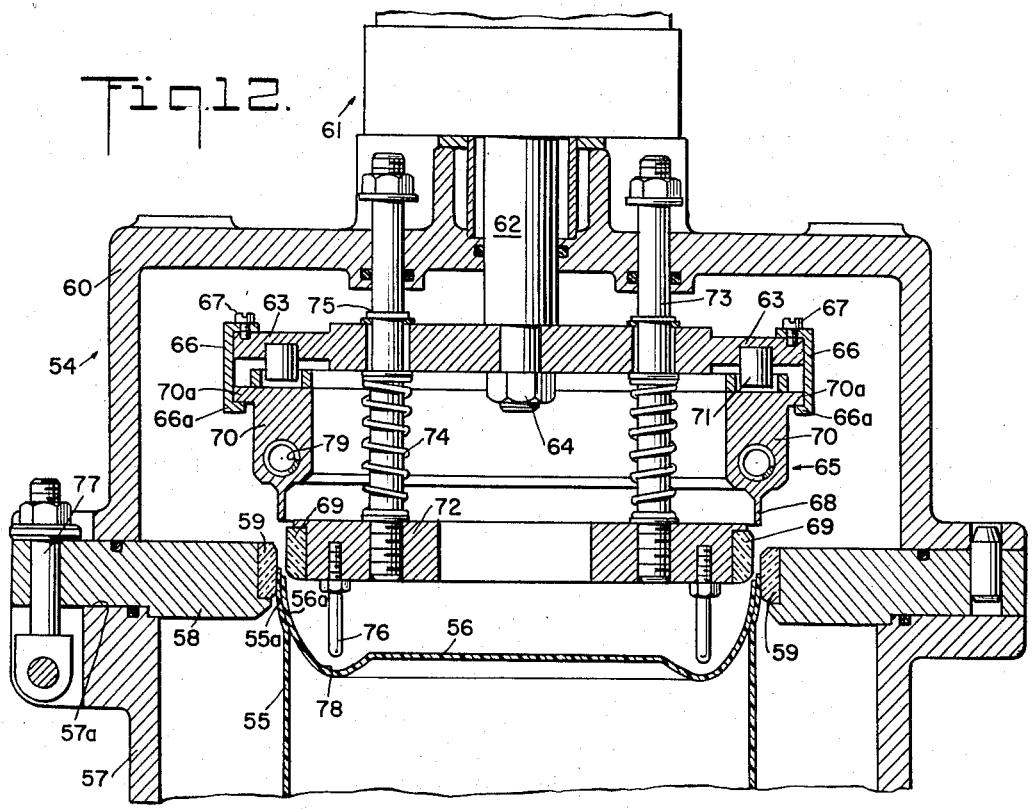
FIG. 12 is a vertical section view of the apparatus of the invention for sealing a container under vacuum conditions showing the seal bar in the upward portion of its cycle of operation.

As shown in FIG. 1, members 20 and 21 of thermoplastic material are positioned between means for enclosing or supporting the members, such as supports 22 and 23. Inner surfaces 20a and 21a of the members are positioned in a facing relationship and substantially contiguous with one another. Outer surfaces 20b and 21b of the members are positioned adjacent to supports 22 and 23. Portions 20c and 21c of the members which are adjacent edges 20d and 21d thereof are adapted to be positioned together and to slide between surfaces 22a and 23a of the supports. The supports can be adapted to clamp portions 20c and 21c of members 20 and 21 when they are inserted therebetween so the members can be held in position with respect to the supports during the sealing operation by other means not shown. Members 20 and 21 are placed between supports 22 and 23 with edges 20d and 21d thereof extending substantially adjacent one another as shown in FIGS. 1 and 8. Thus, edges 20d and 21d can be positioned to be co-planar or slightly offset from one another.

Prior to the sealing operation, the means for heating or melting edges 20d and 21d of the members, such as seal bar 24, is positioned above chamfered surfaces 22b and 23b of the supports. Seal bar 24 which is heated by means not shown is adapted to pass between surfaces 22a and 23a of the supports as the seal bar is advanced toward members 20 and 21. The chamfered surfaces serve to direct the seal bar between the supports if any misalignment should occur during its downward descent. Supports 22 and 23 are mounted in fixtures 25 and 26, respectively. The supports can be fabricated from metal but where it is desired to retard the flow of heat from the seal bar, the supports may be fabricated from insulating material. For example, Teflon, impregnated into fiberglass material, can be employed to render the supports insulators with respect to heat flowing from the seal bar. When the seal bar is fabricated from metal, a metal having a high coefficient of conductivity, such as aluminum, is preferably used.

As shown in FIG. 2 the seal bar, having been heated to a temperature sufficient to melt the thermoplastic material of the members, is moved downwardly past the chamfered surfaces 22b and 23b of the supports, between surfaces 22a and 23a of the supports, and into engagement with edges 20d and 21d of the edge portions of the members. As shown in FIG. 1 edges 20d and 21d have been placed or positioned substantially adjacent to one another between the supports. Upon engagement of the heated seal bar with the members, as shown in FIG. 2, portions 20c and 21c of the members adjacent edges 20d and 21d are melted by the seal bar and the melted material is extruded between the inner surfaces of the members. As determined by the fit of the seal bar with respect to surfaces 22a and 23a of the supports, a portion of the melted plastic material may also be extruded upwardly adjacent to the seal bar. The engagement of the seal bar with the members and the melting of the members due to the temperature of the seal bar causes the plastic material to flow and, at the same time, due to the constriction of the seal bar and the supports, to develop hydrostatic pressure, which urges the melted plastic material between the members. As the melted material flows between the members, it also frequently flows between the supports and the seal bar as well as between the supports and the members, depending upon the degree of clearance between the adjacent elements. Thus the seal bar and the seal bar in conjunction with the supports serve as the means for urging or extruding the melted material of the members between them.

Following the withdrawal of the seal bar and the subsequent cooling of members 20 and 21, the members which are sealed together by the formation of seal 30 can be withdrawn from between the supports. Upon their removal the sealed members appear as shown in FIG. 3 where clearance between the seal bar and the supports has resulted in the formation of flashes 27 and 28 extending from members 20 and 21, respectively. The sealed members also contain flash 29 extruded between their inner surfaces and extending downwardly from seal 30 which has been formed adjacent to end 31 of the sealed members. Flash 29 as shown in FIG. 5 fails to adhere to inner surfaces 20a and 21a of the members during extrusion since these surfaces are not heated to a condition which permits the formation of a bond with the flash.

The extrusion of flash 29 away from the seal bar and between the members serves to sweep or flow away any contamination adjacent inner surfaces 20a and 21a of the members, so that seal 30 is uninterrupted and uniform, thereby providing a leak-proof seal. As shown in the drawings, the sealed region or seal 30 is concentrated adjacent to end 31 of the sealed members and is therefore formed with a relatively small consumption or deformation of the portions of the members adjacent to their edges.

If it is desired that end 31 of the sealed members be substantially uninterrupted or flat, flashes 27 and 28 can be easily removed by means of a hot iron, a hot wire, or any suitable device for removing thin webs of plastic material. As shown in FIG. 5 where the members are separated to reveal details of the seal, it can be seen that flash 29 remains unbonded with respect to members 20 and 21 following the completion of the sealing operation.

In certain instances it is desired to seal members 32 and 33 of thermoplastic material which are provided with coatings 34 and 35. In forming containers it can be advantageous to employ coatings which are disposed adjacent to the interior of the container and which are of a less permeable nature than the material employed in members 32 and 33. Similarly, the coatings may be selected from plastic materials which are more compatible with the contents of a container than would be the material employed in members 32 and 33.

Upon sealing members of the type shown in FIG. 6 having coatings 34 and 35 in a facing relationship, the melting action accompanying contact with the heated seal bar always occurs in the material of the members. However, the melting action may also occur in the material of the coatings as determined by its properties. The hydrostatic pressure present between the members and coatings and the surface of the facing portion of the seal bar results in the material of the coatings and a portion of the material of members 32 and 33 being extruded inwardly adjacent to the coatings. The seal formed as a result of this method, that is seal 36, consists only of the plastic material which forms members 32 and 33. Thus, the coating material is completely swept or flowed away from the seal region. This function is of a special significance where the material of the coating is of a type which can normally not be adequately heat sealed to the same type of material. Thus, regardless of the nature of the coating material, the material of members 32 and 33 is available to form seal 36.

In accordance with the invention, when the seal bar engages the edges of the members disposed between the supports, the material at the edges melts. In response to the confining of the melted material by the advancing seal bar, the supports, and the members, the melted material is subjected to pressure which urges it between the members and also tends to urge it between the seal bar and the supports as well as between the members and the supports. As the melted material passes between the members, it passes for a distance away from the heat of the seal bar, cools and then solidifies into the form of a tongue disposed between the members. Since the material urged between the heated seal bar and the supports is not cooled, the seal bar is fitted closely to the supports to avoid the extrusion of an excessive amount of material adjacent to it. Material that is urged between the members and the supports encounters the relatively lower temperature of the supports and then solidifies. Therefore, there is no excessive amount of flash adjacent the members even though there is a degree of clearance between the members and the supports. It should be understood that the seal bar can be heated prior to engagement or while in engagement with the members and that the heating may be of a continuous nature or of an impulse type.

As shown in FIG. 7, members 32 and 33 having coatings 34 and 35 have been positioned with the coating disposed away from one another during the sealing operation. The result is that flash 38 consists of the material of members 32 and 33 which has been extruded away from the seal bar as opposed to the arrangement in FIG. 6 in which flash 37 is at least the coating material or the coating material combined with a portion of the material of members 32 and 33. From FIGS. 6 and 7 it can be understood that the method of the invention is adapted to the sealing of coated materials, regardless of the orientation of the coatings with respect to the members.

Seal bar 24, as shown in FIGS. 1 and 2, has a substantially flat end surface which engages the members and forms flattened end 31 of the sealed members. Where it is desired, the seal can be provided with other forms by using a seal bar having a contoured or profiled surface such as that of a plurality of teeth or scalloped portions. For example, in FIG. 8 seal bar 39 has a tapered or wedge-shaped end portion 39a which is adapted to contact members 20 and 21. Wedge-shaped end portion 39a enables the seal bar to be fitted more closely with surfaces 22a and 23a of the supports. The wedge shape also can direct or pilot the seal bar with respect to the supports if a degree of misalignment should occur. Upon engagement of seal bar 39 with members 20 and 21, the sealing process which occurs is substantially the same as that discussed with respect to seal bar 24. However, due to the shape of tapered end portion 39a, the end of the sealed members, upon completion of the sealing operation, is substantially a V-shaped form, which corresponds in general to that of tapered portion 39a as opposed to the flat form of end 31 shown in FIGS. 3 and 4. Thus, the sealed members have a line of intersection corresponding to the apex of the V-shape extending above the seal and substantially in line with the inner surfaces of members 20 and 21. The line of intersection is analogous to that shown in FIGS. 5–7 when the members are spread apart and the end of the sealed members assumes a flattened V-shape. Experience has shown that seal bar 39 is capable of reducing the hash which extends upwardly so that it is possible to reduce the height of the flash as compared to that shown in FIG. 3 resulting from the use of seal bar 24 having a substantially flat facing portion. The line of intersection resulting in the seal formed by seal bar 39 can serve the useful purpose of providing a guide line which overlies the seal. Thus, the guide line can be used as a means of identifying the portion of the members which must be severed in order to open or cut apart the seal.

In order to eliminate the need for the seal bar to pass between both of the supports the construction of FIG. 9 can be employed. Here support 40 is mounted upon fixture 41 which is in turn resiliently mounted by spring 42 extending from base 43. Support 44 is mounted upon fixture 45 similarly as support 22. The members of thermoplastic material to be sealed by the construction of FIG. 9 can be those of a container or base portion 46 and cover 47 having edge portions 46a and 47a, respectively. In FIG. 9, seal bar 48 which is wider than the gap between the supports initially engages support 40 as the seal bar descends. At this point, seal bar 48 passes adjacent to surface 44a of support 44. Upon further downward motion of seal bar 48, support 40 is forced downwardly against the bias of spring 42 and the seal bar engages the end portions of the container and cover. After initially engaging the end portions of the container and cover, the seal bar continues to descend and extrudes the material downwardly between the contiguous surfaces of the container and cover. In addition to forming flash 49 between the contiguous surfaces, the seal bar can also produce flashes 50 and 51 as determined by the fit of the seal bar with respect to surface 44a of the support and the degree of engagement with support 40. Since seal bar 48 is adapted to form a close clearance with support 44 and support 40, it is possible to seal container 52 and cover 53, as shown in FIG. 11, which have edge portions 52a and 53a, respectively, having a relatively greater clearance between the supports.

The seal and the method of forming it in accordance with the invention are especially suited to the fabricating of hermetically-tight containers of thermoplastic material which can be used in place of the conventional metal can and glass jar or bottle. The seal and method of the invention are well suited for such a use since all portions of the cover seal can be formed in a rapid manner during one operation. Furthermore, the extrusion action which occurs during sealing insures that the contents of the container or any deposit resulting therefrom are flowed or swept away from the seal area and therefore are prevented from interrupting or preventing the obtaining of a complete and tight seal.

Figure 13:
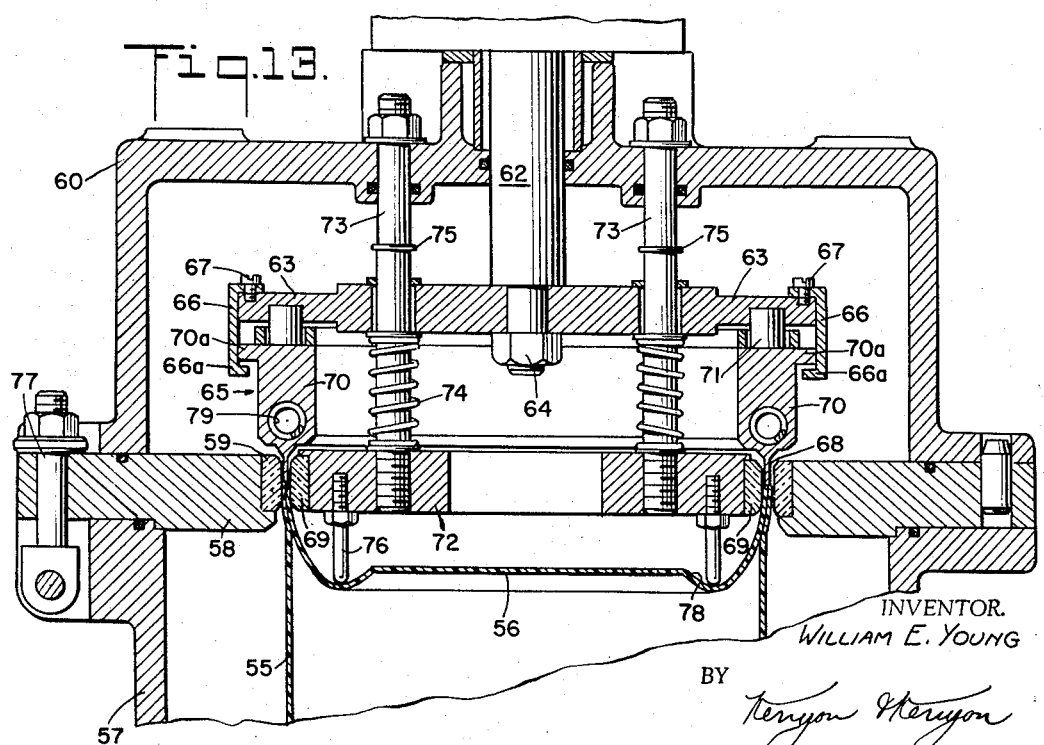
FIG. 13 is a fragmentary vertical section view showing the apparatus of FIG. 12 in its downward operating position.

Apparatus or machine 54 shown in FIGS. 12 and 13 is adapted to seal containers or base members 55 of thermoplastic material with covers or cover memers 56 of thermoplastic material. The machine includes housing 57 which is capable of withstanding internal or external pressure which accompanies pressure or vacuum packing, respectively. Fixture 58 is mounted on edge 57a of the housing and in turn mounts support 59. Cover 60 overlies the housing and bears upon fixture 58. The cover and housing are sealed with respect to the fixture by the use of O-ring seals.

When container 55 is placed within the machine edge portion 55a thereof extends to adjacent support 58. After the container is placed within the machine, cover 56 is installed loosely upon the container with edge portion 56a thereof adjacent to edge portion 55a of the container. Cover 60 can then be closed and the environment within the machine conditioned.

Actuator 61 which is mounted upon cover 60 has its piston rod 62 extending downwardly through the cover and sealed therewith by an O-ring seal. Plate 63 is secured to the piston rod by nut 64. Beneath plate 63 seal bar 65 is mounted by brackets 66 which are attached to the plate by screws 67. For a round container, seal bar 65 is circular in form and includes sealing portion 68 which is adapted to pass between support 59 and movable support 69 when the seal bar is advanced toward the edges of the container and cover. Base portion 70 of the seal bar includes shoulder 70a which is engaged by hook 66a of each of the brackets. Spacer 71 positions the base portion of the seal bar with respect to plate 63. Since the diameter of the seal bar increases as it is elevated from room temperature to its operating temperature, shoulder 70a is fitted to have an initial radial clearance with respect to each of brackets 66. As the seal bar approaches its operating temperature condition, it expands to a position where sealing portion 68 thereof moves into axial alignment with the gap formed between the supports and shoulder 70a moves to adjacent brackets 66.

Support 69 is mounted upon fixture 72 which is attached to pins 73 extending through openings in plate 63 and cover 60. As shown in FIG. 12 springs 74 bias fixture 72 away from plate 63 to a position at which collars 75 engage the upper surface of the plate. Push rods 76 extend from the bottom surface of fixture 72. With container 55 and cover 56 loosely assembled within the machine, cover 60 is closed and fastened by toggle bolts 77. In the case of vacuum packaging the interior of the housing and cover are evacuated and the loose fit of the cover with respect to the container enables the interior portion of the container to be simultaneously evacuated. Upon the activation of actuator 61, piston rod 62 begins to move in a downward direction. Push rods 76 then engage annular recess 78 of cover 56 and move the cover downwardly and into seating engagement with the container. The annular recess enables the push rods to cam the cover into position regardless of whether the cover is initially somewhat tilted with respect to the container.

In FIG. 13 the cover is shown fully seated within the container and sealing portion 68 heated by electrical heating element 79 extending through base portion 70 of the seal bar is shown engaging edge portions 55a and 56a. This engagement initiates the sealing operation in accordance with the invention. During the sealing cycle push rods 76 maintain the cover in the correct position with respect to the container. Upon completion of the heating cycle, actuator 61 is reversed and push rod 62 moves upwardly, thereby withdrawing the seal bar from its operative position and subsequently withdrawing the push rods from engagement with the cover. The cover is then opened and the sealed cover and container assembly removed.

When it is desired to evacuate container 55 with cover 56 removed therefrom, the cover can be mounted upon moving support 69 instead of being placed on the container. The cover can frictionally engage movable support 69 or the support can be provided with cover holding means (not shown) to support the cover above the container as the container is being evacuated. Vacuum or mechanical gripping elements can comprise the cover holding means. After the support member descends and engages the cover to the container, the holding means is released or the release may take place after the sealing operation is completed.

With this apparatus and method, it can be understood that the container and cover, both of thermoplastic material, can be conveniently and rapidly assembled and sealed. Once the edge of the cover is substantially adjacent to the top edge of the container, they are ready to be sealed. The shouldered construction at the top edge of the container in FIGS. 12 and 13 facilitates the assembly and alignment of the edges of the container and cover. Upon the application of the seal bar to the edge of the container and cover, regardless of whether the container is circular, rectangular, etc., all portions are sealed simultaneously. In addition the extruding action of the method carries away foreign matter, coating material, etc., from the seal region and enables a tight and continuous seal to be formed.

FIGS. 12 and 13 show one embodiment of the container of the invention in which edge portion 55a of the container and edge portion 56a of the cover extend upwardly. In another embodiment of the container of the invention, the container can be provided with outwardly extending flanges, that is with flanges extending radially from the container. With such an embodiment, the cover can be a flat disc which rests upon the flange of the container with the periphery of the disc adjacent to the free edge of the flange. Such an arrangement in section would appear similar to the members in FIGS. 9 and 10 where member 47 corresponds to the container and member 46 to the cover.

In still another embodiment of the invention, both the container and the cover can be provided with outwardly extending radial flanges which are assembled with the flanges facing and contiguous to one another. The facing flanges would appear as members 20 and 21 in FIGS. 1 and 2 during the sealing operation.

In still a further embodiment of the invention, the flange of the container is spaced apart from and extends parallel and adjacent to the open end portion of the container. Thus the open end portion of the container appears to be folded back upon itself. With a container of this form, the cover is cup-shaped with a flange portion or side portion which engages the container's flange when installed thereon. Here again the edges of the cup-shaped cover and the edges of the folded-back flange of the container are sealed to one another by the process of the invention.

Although various versions and embodiments of the invention have been shown and described herein, it is understood that certain changes within the scope of the appended claims may be made by those skilled in the art without departing from the scope and the spirit of this invention.

What is claimed is:

1. The method of sealing two members of thermoplastic material to one another in the portion adjacent an edge of each of said members comprising the steps of placing said members with the edges thereof extending substantially adjacent one another and the surfaces of the portions of said members adjacent said edges being in a facing relationship and substantially contiguous with one another, melting at least some of said portions adjacent said edges, extruding at least some of the melted material between said facing surfaces of said portions adjacent said edges, said extruding forming a flash of material between said facing surfaces, and solidifying the melted material of said portions adjacent said edges, whereby said members are sealed to one another adjacent to the final edges thereof formed during the solidifying.

2. The method of sealing two members of thermoplastic material to one another in the portion adjacent an edge of each of said members comprising the steps of placing said members with the edges thereof extending substantially adjacent one another and the surfaces of the portions of said members adjacent said edges being in a facing relationship and substantially contiguous with one another, heating said edges to melt at least some of the material of said portions adjacent said edges, extruding at least some of the melted material between said facing surfaces of said portions adjacent said edges, said extruding forming a flash of material between said facing surfaces, and solidifying the melted material of said portions adjacent said edges, whereby said members are sealed to one another adjacent to the final edges thereof formed during the solidifying.

3. The method of sealing two members of thermoplastic material to one another in the portion adjacent an edge of each of said members comprising the steps of placing said members with the edges thereof extending substantially adjacent one another and the surfaces of the portions of said members adjacent said edges being in a facing relationship and substantially contiguous with one another, melting at least some of said portions adjacent said edges, confining the material being melted adjacent said edges to extrude at least some of the melted material between said facing surfaces of said portions adjacent said edges, whereby said members are sealed to one another adjacent to the final edges thereof formed during solidifying.

4. The method of sealing two members of thermoplastic material to one another in the portion adjacent an edge of each of said members comprising the steps of placing said members with the edges thereof extending substantially adjacent one another and the surfaces of the portions of said members adjacent said edges being in a facing relationship and substantially contiguous with one another, melting at least some of said portions adjacent said edges, extruding at least some of the melted material between said facing surfaces of said portions adjacent said edges, said extruding forming a flash of material between said facing surfaces, and cooling the melted material of said portions adjacent said edges to solidify said material, whereby said members are sealed to one another adjacent to the final edges thereof formed during the solidifying.

5. The method of sealing two members of thermoplastic material to one another in the portion adjacent an edge of each of said members comprising the steps of placing said members with the edges thereof extending substantially adjacent one another and the surfaces of the portions of said members adjacent said edges being in a facing relationship and substantialy contiguous with one another, enclosing the oppositely disposed surfaces of said portions adjacent said edges which extend substantially parallel to said edges, melting at least some of said portions adjacent said edges while being enclosed, urging at least some of the melted material between said facing surfaces of said portions adjacent said edges while being enclosed, said urging forming a flash of material between said facing surfaces, and solidifying the melted material of said portions adjacent said edges, whereby said members are sealed to one another adjacent to the final edges thereof formed during the solidifying.

6. The method of sealing two members of thermoplastic material to one another in the portion adjacent an edge of each of said members comprising the steps of positioning the edges of said members and the portions adjacent thereto within the space between a pair of supports, said edges extending substantially adjacent one another and the surfaces of said portions adjacent said edges being in a facing relationship and substantially contiguous with one another, said supports being adjacent to said members positioned therebetween, melting at least some of said portions adjacent said edges while said edges and said portions adjacent thereto are positioned within the space between said supports, confining the material being melted to urge at least some of the melted material between said facing surfaces of said portions adjacent said edges, said urging forming a flash of material between said facing surfaces, and cooling said portions adjacent said edges to solidify the melted material thereof, whereby said members are sealed to one another adjacent to the final edges thereof formed during cooling.

7. The method of sealing two members of thermoplastic material to one another in the portion adjacent an edge of each of said members comprising the steps of positioning the edges of said members and the portions adjacent thereto within the space between a pair of supports, said edges extending substantially adjacent one another and the surfaces of said portions adjacent said edges being in a facing relationship and substantially contiguous with one another, said supports being substantially contiguous to said members positioned therebetween, melting at least some of said portions adjacent said edges while said edges and said portions adjacent thereto are within the space between said supports, confining the material being melted to urge at least some of the melted material between said facing surfaces of said portions adjacent said edges, said urging forming a flash of material between said facing surfaces, and cooling said portions adjacent said edges to solidify the melted material thereof, whereby said members are sealed to one another adjacent to the final edges thereof formed during cooling.

8. The method of sealing two members of thermoplastic material to one another in the portion adjacent an edge of each of said members comprising the steps of positioning the edges of said members and the portions adjacent thereto within the space between a pair of supports, said edges extending substantially adjacent one another and the surfaces of said portions adjacent said edges being in a facing relationship and substantially contiguous with one another, said supports being adjacent to said members positioned therebetween, clamping said supports into engagement with said members positioned therebetween, melting at least some of said portions adjacent said edges while said edges and said portions adjacent thereto are within the space between said supports, confining the material being melted to urge at least some of the melted material between said facing surfaces of said portions adjacent said edges, said urging forming a flash of material between said facing surfaces, and cooling said portions adjacent said edges to solidify the melted material thereof, whereby said members are sealed to one another adjacent to the final edges thereof formed during cooling.

9. The method of sealing two members of thermoplastic material to one another in the portion adjacent an edge of each of sad members comprising the steps of positioning the edges of said members and the portions adjacent thereto within the space between a pair of supports, said edges extending substantially adjacent one another and the surfaces of said portions adjacent said edges being in a facing relationship and substantially contiguous with one another, said supports being adjacent to said members positioned therebetween, heating said edges to melt at least some of the material of said portions adjacent said edges while said edges and said portions adjacent thereto are within the space between said supports, confining the material being melted to urge at least some of the melted material between said facing surfaces of said portions adjacent said edges, said urging forming a flash of material between said facing surfaces, and cooling said portions adjacent said edges to solidify the melted material thereof, whereby said members are sealed to one another adjacent to the final edges thereof formed during cooling.

10. The method of sealing two members of thermoplastic material to one another in the portion adjacent an edge of each of said members comprising the steps of positioning the edges of said members and the portions adjacent thereto between a pair of supports, said edges extending substantially adjacent one another and the surfaces of said portions adjacent said edges being in a facing relationship and substantially contiguous with one another, said supports being adjacent to said members positioned therebetween, melting at least some of said portions adjacent said edges by advancing a heated device extending along the length of said edges between said supports into engagement with said edges, the advancing of the heated device urging the melted material between said facing surfaces and forming a flash of material between said facing surfaces, and cooling said portions adjacent said edges to solidify the melted material thereof, whereby said members are sealed to one another adjacent to the final edges thereof formed during cooling.

11. The method of sealing two members of thermoplastic material each having a coating to one another in the portion adjacent an edge of each of said members comprising the steps of positioning the edges of said members and the portions adjacent thereto within the space between a pair of supports with the outer surfaces of the coatings of said members being adjacent one another, said edges extending substantially adjacent one another and the coatings of said portions adjacent said edges being in a facing relationship and substantially contiguous with one another, said supports being adjacent to said members positioned therebetween, melting at least some of the material of said portions while said edges and said portions adjacent thereto are positioned within the space between said supports, applying pressure to the material being melted to urge at least some of the melted material of said portions and the portion of said coatings adjacent said melted material between said facing surfaces of said coating of said portions adjacent said edges, and solidifying the melted material of said portions adjacent said edges, whereby said members are sealed to one another adjacent to the final edges thereof formed during the solidifying.

12. Apparatus for sealing two members of thermoplastic material to one another in the portion adjacent an edge of each of said members when the edges of said members are extending substantially adjacent one another and the surfaces of the portions of said members adjacent said edges are in a facing relationship and substantially contiguous with one another, said apparatus comprising means adapted to be disposed adjacent the opposite sides of said members when said members are substantially contiguous to one another for enclosing said edges and said portions adjacent said edges, a bar element, means for heating said bar element, said heated bar element being adapted to melt the material in a condition of melting which enables the melted material to be extruded between said facing surfaces, said heated bar element being adapted to be moved relative to said enclosing means, the clearance between said heated bar element and said enclosing means being sufficiently close to enable said heated bar element to develop hydrostatic pressure within the melted material disposed between said enclosing means, and means for advancing said heated bar element relative to said enclosing means and into engagement with said edges to melt at least some of said portions adjacent said edges and to displace at least some of the melted portion disposed between said enclosing means, said heated bar element during the advancing thereof developing hydrostatic pressure within the melted material being displaced and urging at least some of the melted material between said facing surfaces of said portions adjacent said edges, and forming a flash of melted material between said facing surfaces, whereby said members after the solidifying of the melted material are sealed to one another adjacent to the final edges thereof formed during the solidifying.

13. Apparatus for sealing two members of thermoplastic material to one another in the portion adjacent an edge of each of said members when the edges of said members are extending substantially adjacent one another and the surfaces of said portions adjacent said edges are in a facing relationship and substantially contiguous with one another, said apparatus comprising means adjacent the outer side surfaces of said portions adjacent said edges for supporting said portions positioned therebetween, a bar element, means for heating said bar element, said heated bar element being adapted to melt the material in a condition of melting which enables the melted material to be extruded between said facing surfaces, said heated bar element being adapted to be moved relative to said enclosing means, the clearance between said heated bar element and said enclosing means being sufficiently close to enable said heated element to develop hydrostatic pressure within the melted material disposed between said supporting means, and means for advancing said heated bar element between said supporting means and into engagement with said edges, said heated bar element during the advancing thereof melting at least some of said portions adjacent said edges and displacing at least some of the melted portion disposed between said enclosing means to urge at least some of the melted material between said facing surfaces of said portions adjacent said edges to form a flash of melted material therebetween, whereby said members after the solidifying of the melted material are sealed to one another adjacent to said edges.

14. Apparatus for sealing two members of thermoplastic material to one another in the portion adjacent an edge of each of said members when the edges of said members are extending substantially adjacent one another and the surfaces of said portions adjacent said edges are in a facing relationship and substantially contiguous with one another, said apparatus comprising means adjacent the outer side surfaces of said portions adjacent said edges for supporting said portions positioned therebetween, a bar element having a substantially wedge-shaped portion extending along the length of said element, means for heating said bar element, said heated bar being adapted to melt the material in a condition of melting which enables the material to be used between said facing surfaces, said heated bar element being adapted to be moved relative to said supporting means, the clearance between said heated bar element and said supporting means being sufficiently close to enable said heated bar element to develop hydrostatic pressure within the melted material disposed between said suporting means, and means for advancing said wedge-shaped portion of said heated bar element between said supporting means and into engagement with said edges, said heated bar element during the advancing thereof melting at least some of said portions adjacent said edges and developing hydrostatic pressure within the melted material disposed between said supporting means which pressure urges at least some of the melted material between said facing surfaces of said portions adjacent said edges to form a flash of melted material therebetween, whereby said members after the solidifying of the melted material are sealed to one another adjacent to said edges.

References Cited
UNITED STATES PATENTS

| | | | |
|---|---|---|---|
| 2,678,471 | 5/1954 | Barton | 264—248 |
| 2,994,361 | 8/1961 | Gable et al. | 264—248 |
| 2,996,232 | 8/1961 | Walker | 229—5.5 |
| 3,107,838 | 10/1963 | Brys et al. | 229—5.5 |
| 3,144,495 | 8/1964 | Makowski | 264—248 |

ROBERT F. WHITE, *Primary Examiner.*

JOSEPH R. LECLAIR, *Examiner.*

J. F. McNULTY, T. J. CARVIS, *Assistant Examiners.*